United States Patent
Krueger et al.

(10) Patent No.: US 11,113,506 B2
(45) Date of Patent: Sep. 7, 2021

(54) METHOD FOR PROVIDING AN EVALUATION MEANS FOR AT LEAST ONE OPTICAL APPLICATION SYSTEM OF A MICROSCOPE-BASED APPLICATION TECHNOLOGY

(71) Applicant: OLYMPUS SOFT IMAGING SOLUTIONS GmbH, Münster (DE)

(72) Inventors: Daniel Krueger, Berlin (DE); Mike Woerdemann, Ostbevern (DE); Stefan Diepenbrock, Münster (DE)

(73) Assignee: OLYMPUS SOFT IMAGING SOLUTIONS GmbH, Münster (DE)

( * ) Notice: Subject to any disclaimer, the term of this patent is extended or adjusted under 35 U.S.C. 154(b) by 100 days.

(21) Appl. No.: 16/532,859

(22) Filed: Aug. 6, 2019

(65) Prior Publication Data
US 2020/0050830 A1 Feb. 13, 2020

(30) Foreign Application Priority Data
Aug. 9, 2018 (EP) .................................... 18188286

(51) Int. Cl.
*G06K 9/00* (2006.01)
*G06K 9/62* (2006.01)
(52) U.S. Cl.
CPC ....... *G06K 9/00134* (2013.01); *G06K 9/0014* (2013.01); *G06K 9/6256* (2013.01)
(58) Field of Classification Search
CPC . G06K 9/00134; G06K 9/0014; G06K 9/6256
(Continued)

(56) References Cited

U.S. PATENT DOCUMENTS

| | | | |
|---|---|---|---|
| 2015/0238148 A1* | 8/2015 | Georgescu ........... | G06K 9/4628 600/408 |
| 2016/0155241 A1* | 6/2016 | Wei ........................ | G06T 7/215 382/103 |

OTHER PUBLICATIONS

Christiansen et al., In Silico Labeling: Predicting Fluorescent Labels in Unlabeled Images, Cell, 2018, vol. 173, No. 3, p. 792-803.
(Continued)

*Primary Examiner* — Ayodeji O Ayotunde
(74) *Attorney, Agent, or Firm* — Rudy J. Ng; Bret E. Field; Bozicevic, Field & Francis LLP

(57) ABSTRACT

The invention concerns a method for providing an evaluation means (60) for at least one optical application system (5) of a microscope-based application technology,
wherein the following steps are performed, in particular each by an optical training system (4):
 performing an input detection (101) of at least one sample (2) according to the application technology in order to obtain at least one input record (110) of the sample (2) from the input detection (101),
 performing a target detection (102) of the sample (2) according to a training technology to obtain at least one target record (112) of the sample (2) from the target detection (102), the training technology being different from the application technology at least in that additional information (115) about the sample (2) is provided,
 training (130) of the evaluation means (60) at least on the basis of the input recording (110) and the target recording (112), in order to obtain a training information (200) of the evaluation means (60),
in that various sample positions are automatically detected during the input detection (101) and/or during the target detection (102) so that, in particular, the training information
(Continued)

Figure 1:
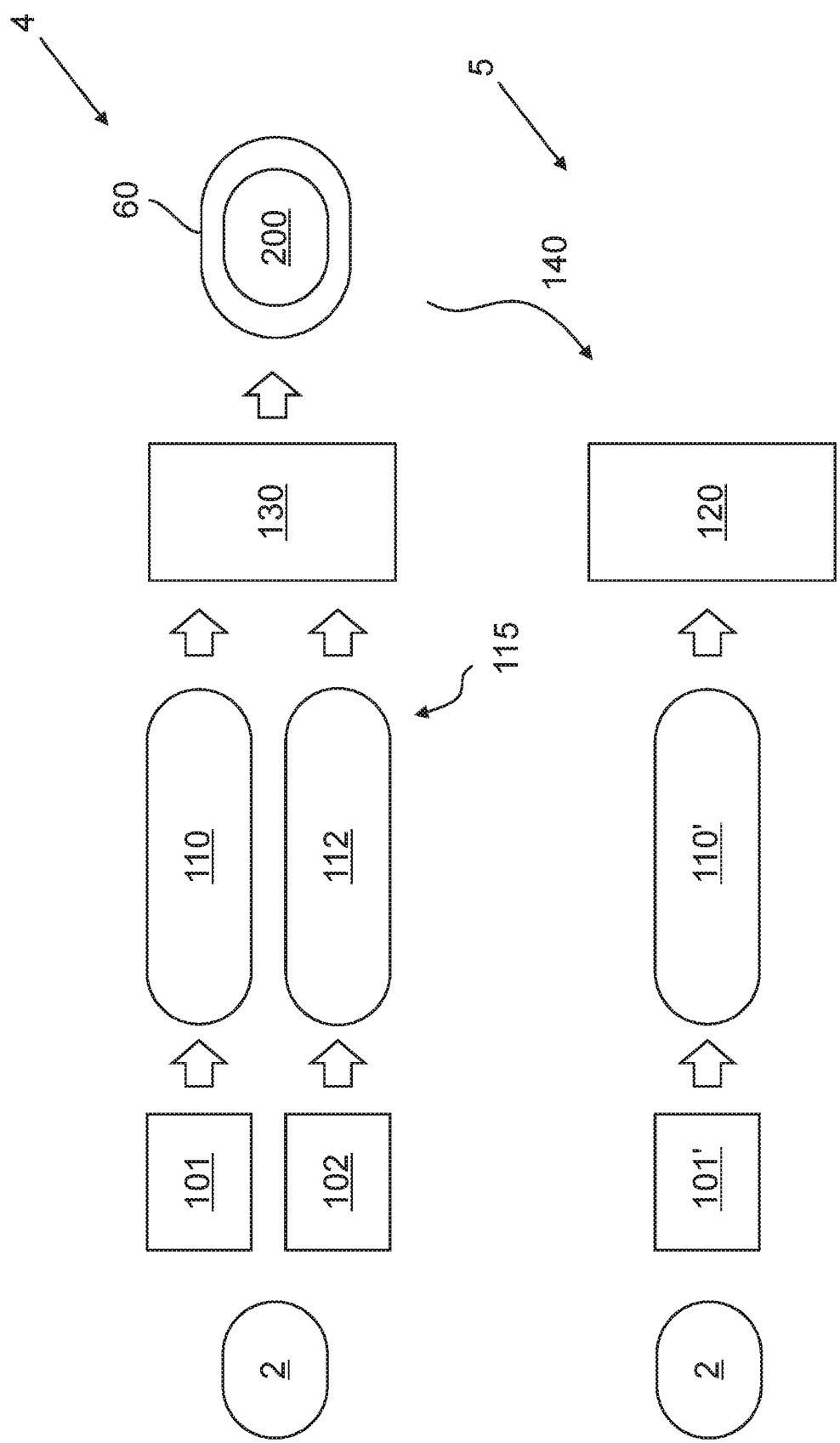

(200) for a continuous relative movement of the sample is trained to determine the additional information (115).

15 Claims, 5 Drawing Sheets

(58) Field of Classification Search
USPC .......................................................... 382/103
See application file for complete search history.

(56) References Cited

OTHER PUBLICATIONS

Ounkomol et al., Label-Free Prediction of Three-Dimensional Fluorescence Images from Transmitted Light Microscopy, Nature Methods, 2018, vol. 15, p. 917-920.
Lo Conti et al., A Regularized Deep Learning Approach for Image Deblurring, Internet of Things and Machine Learning, 2017, vol. 17, p. 1-5.
Weigert et al., Content-Aware Image Restoration: Pushing the Limits of Fluorescence Microscopy, Nature Methods, 2018, vol. 15, p. 1-16.
Wang et al., Deep Learning Achieves Super-Resolution in Fluorescence Microscopy, Nature Methods, 2018, vol. 16, p. 1-29.
Extended European Search Report for European Patent Application No. 19 185 970.1, dated Sep. 12, 2019, and its English summary, 10 pages.

* cited by examiner

METHOD FOR PROVIDING AN EVALUATION MEANS FOR AT LEAST ONE OPTICAL APPLICATION SYSTEM OF A MICROSCOPE-BASED APPLICATION TECHNOLOGY

The present invention relates to a method for providing an evaluation tool for at least one optical application system of a microscope-based application technology. Furthermore, the invention relates to a system, a computer program and a computer-readable medium.

From the state of the art it is known that a so-called ground truth for the training of training methods from the field of machine learning is obtained by complex procedures. In particular, the segmentation of samples to determine the ground truth can be very time-consuming and often only performed by manual intervention. Data from different data sources often have to be brought together and elaborately processed.

It is therefore an object of the present invention to at least partially eliminate the disadvantages described above. In particular, it is the object of the present invention to propose an improved possibility for the use of training methods in microscopic systems.

The disclosure CHRISTIANSEN, ERIC M. ET AL. "In Silico Labeling: Predicting Fluorescent Labels in Unlabeled Images", CELL, Issue. 173, Nr. 3, page 792-803, 19 Apr. 2018, Chawin Ounkomol ET AL: "Label-free prediction of three-dimensional fluorescence images from transmitted light microscopy", bioRxiv, 23. Mai 2018 and FRANCESCO LO CONTI ET AL: "A regularized deep learning approach for image deblurring", INTERNET OF THINGS AND MACHINE LEARNING, 17 Oct. 2017 show a method according to the state of the art.

The above object is solved by a method with the features according to the present disclosure, a system with the features according to the present disclosure, a computer program with the features according to the present disclosure, a computer program with the features according to the present disclosure, and a computer-readable medium with the features according to the present disclosure. Further features and details of the invention result from the respective dependent claims, description and drawings. Features and details which are described in connection with the method according to the invention also apply, of course, in connection with the system according to the invention, the computer programs according to the invention as well as the computer-readable medium according to the invention, and vice versa in each case, so that with regard to the disclosure, mutual reference to the individual aspects of the invention is or can always be made.

In particular, the object is solved by a method for providing (at least) one evaluation means for at least one optical application system of a microscope-based application technology.

In particular, it is provided that the following steps are performed, preferably by an optical recording system, in particular a training system:
performing an input detection of at least one sample according to the application technology in order to obtain at least one input record of the (at least one) sample from the input detection,
performing a target detection of the (at least one) sample according to a training technology in order to obtain at least one target recording of the (at least one) sample on the basis of the target detection, wherein preferably the training technology differs from the application technology at least in that additional information about the (at least one) sample is provided by the training technology and is preferably determined from the target recording,
the evaluation means at least on the basis of the input recording and the target recording, in order to obtain at least one training information of the evaluation means.

The preceding steps can be repeated in any order or in the order specified and, if necessary, also individually. Preferably, the steps are completely or predominantly automated, especially without manual intervention. The at least partially manual execution of steps is also conceivable, especially on the application system side.

It can be an advantage in a method according to the invention if different sample positions are recorded automatically during input detection and/or target detection, so that in particular the training information for a continuous relative movement of the sample is trained to determine the additional information. It may also be optionally provided that, by detecting the various sample positions, the training information for a continuous relative movement of the sample is trained to determine the additional information, wherein the input detection and the target detection are each performed as training system-side detection by an optical training system, and in particular wherein the application technology and training technology is configured as a microscopy or a flow cytometry.

It may be provided that the training technology differs from the application technology at least in that additional information about the (at least one) sample is provided (i.e. determined or available) by the training technology. This means that in an application system that provides the application technology in an identical or similar way to the training system, the additional information is not determined on the basis of the application technology, but possibly only approximately on the basis of the evaluation tool. The application technology may not be able to determine the additional information, or only be able to do so in principle. For example, the determination of the additional information by the application technology is more time-consuming than by the training technology, so that the additional information is not provided by the application technology in the method according to the invention. Optionally, the training technology can differ from the application technology at least in that the additional information is provided by the fact that an exposure time is used longer with the target detection than with the input detection. Thus, the additional information can be an additional image information (due to the longer exposure time). Especially with the (application system-side) continuous sample relative movement it may be necessary to use shorter exposure times, so that optionally the use of the continuous sample relative movement can only be made possible by the additional information.

The application technology can also be implemented in the training system (in contrast to the application system), for example, by synthetically emulating it and/or providing it through a neural network. This also enables to flexibly provide different application technologies, e.g. software-supported in the training system, for different training procedures.

It can be an advantage in a method according to the invention if different sample positions are detected automatically during input detection and/or target detection, so that in particular the training information for a continuous relative movement of the sample is trained to determine the additional information. The different sample positions can be obtained e.g. by an automated step-by-step and/or continuous sample relative movement (also: relative sample movement). The training for determining the additional information is particularly suitable for determining the training information in such a way that the evaluation means learned in this way at least approximately determines the additional information during a subsequent evaluation on the application system side. For this purpose, e.g. methods of machine learning are used for training and/or recording according to the application technology by the application system to determine input data for evaluation.

A relative displacement of the sample (in particular executed as a sample movement and/or detection system movement for changing the sample position) can be understood as a displacement of the sample relative to the detection system (e.g. to the training and/or application system, in particular to a detection optics and/or detection device). This can be achieved, for example, by moving the detection device and/or the detection optics relative to the sample, or vice versa. Accordingly, a relative movement of the sample can also be understood as a movement in which either the sample moves relative to the detection system, or vice versa. Of course, both the sample and the detection system can be moved. It is particularly important that the sample area which is detected changes. The use of a motorized sample stage for the direct movement of the sample to achieve the relative displacement of the sample has the advantage, for example, that a large number of samples or objects of the sample can be detected over a wide range and, in the case of a light sample, less mass has to be moved. The movement of a part of the detection system, such as the detection optics or the detection device, has the advantage that the sample itself is not subjected to accelerations and is therefore particularly advantageous in the case of a detection device of low mass. Both can be done manually to avoid the effort of motorization.

In particular, the training information for a continuous sample relative displacement, in particular sample displacement or sample movement, for determining the additional information is learned by recording different sample positions for at least one sample. This means that the training takes place in such a way (e.g. by using the relative movement of the sample and/or evaluation of the various sample positions) that a (subsequent and/or renewed) continuous relative movement of the sample (which or preferably at least one other sample) can be used by the evaluation means trained in this way in order to determine the additional information at least approximately. This continuous sample relative movement occurs, for example, in an application system with at least one further sample after the training has been completed and/or the trained evaluation tool is provided for the application system. The continuous sample relative displacement is to be understood as a detection method in which a sample is moved continuously (e.g. transversally) so that, depending in particular on the speed of movement and the detection speed and/or the exposure time, the detection may be influenced by the movement, such as motion blur and/or noise and/or other interfering influences. It is advantageous that the continuous relative movement of the sample is performed in the application system for samples which are different from the at least one sample recorded in the training system, but which may have a similar configuration to it. Alternatively, it may also be possible for the application system to perform only a step-by-step sample relative movement or no sample relative movement. In this case, however, there is an advantage in the (step-by-step or continuous) relative movement of the sample in the method according to the invention or in the training system, as a large number of training data can be determined in a short time.

Optionally, it is conceivable that during input detection and/or target detection different sample positions may be detected automatically, whereby the different sample positions are obtained by an automated step-by-step and/or continuous sample relative movement, so that the training information for a continuous sample relative movement is trained to determine the additional information. The training information can be determined in such a way that the evaluation tool learned in this way at least approximately determines the additional information during a subsequent evaluation on the application system side. Training can be performed by determining the training information for the evaluation tool by machine learning methods, whereby the training information can be a classifier or a model or a weighting for the evaluation tool.

It may also be possible that the sample position is changed and/or a relative movement of the sample takes place before each input and target detection. For example, a first input detection and target detection takes place at a first position of the sample, followed by a second input detection and target detection at a second position of the sample, and so on. Only after all input and target data detection at the different sample positions have been performed can the step of training be performed, if necessary.

The training takes place, for example, by determining the training information for the evaluation tool. This can be done advantageously through methods of machine learning, in particular deep learning. Accordingly, the training information can be a classifier or a model or a weighting for the evaluation tool. It may therefore be sufficient for the provision of the learnt evaluation tool for the application system that the training information is transmitted to the application system by a data exchange. This is particularly possible if the application system already has an evaluation tool or a similar computer program that can use the training information and is thus parameterized to a "learnt" evaluation tool on the basis of the transmitted training information.

An optical detection system, such as the application and/or training system, may provide sample detection by an optical magnification method for cell and/or sample imaging and/or microscopy and/or flow cytometry. For example, the detection system can be configured as a microscope system for transmitted light microscopy. In particular, the application and/or training system may provide only microscopy and/or no flow cytometry.

Sample detection can be performed by determining at least one detection information about the sample by means of the detection system. The recording information may be, for example, a training system input recording or application system recording information (possibly of the same type). This can then be evaluated by a pre-learned evaluation using an evaluation tool (e.g. using machine learning and/or deep learning methods and/or artificial intelligence and/or neural networks), in particular in an application system, in order to determine result information about the sample. Depending on the training of an evaluation tool for evaluation (if sufficient training data is used), the result information can at least approximately provide additional information about the sample which would otherwise only be accessible with considerably complex procedures. Thus, the result information can be executed as additional information about the sample or can estimate or predict such additional information. For example, the evaluation can also provide an evaluation method, such as a sample-specific assay.

It may be optionally provided that the evaluation means or the training information is trained by the training, that the target recording and/or the additional information is estimated from the input recording and/or from the recording information on the application system side. For this purpose, a weighting of neurons in a neuronal network of the evaluation medium can be adapted, for example, and this adaptation can be stored in the training information.

In addition, it is optionally possible to use pulsed illumination of the sample during input detection and/or application system-side detection, which is performed asynchronously in a pulsed manner with respect to the detection of a camera sensor.

Furthermore, it is optionally possible for the input recording and/or application system detection information of the sample to contain at least two recorded images of the sample, e.g. transmission images of the sample taken shortly one on top of the other, in particular in the case of a continuous relative movement of the sample.

It is also optionally provided that a ground truth is determined directly or indirectly from the target recording 112. Indirectly, this can be done, for example, by using a result of an evaluation using the training information or the trained evaluation tool or another neural network (as result information) as ground truth. For example, the training information and/or the semi-skilled evaluation tool and/or the network has previously been trained using target record 112, or target record 112 has been used as an input for evaluation to determine the result information therefrom.

The detection information is, for example, an image recording, in particular a microscopic image, of the sample. The image data of the image recording can be used particularly advantageously in combination with the described evaluation, especially if the evaluation uses methods of supervised training and large annotated training data are available for training. The training data can be, for example, input records and target records, such as detection information from microscopy and/or flow cytometry. In particular, the training data can be generated automatically (if necessary, completely) without the need for manual annotation or the like. This opens up the possibility of training the evaluation tool (e.g. an artificial neural network) automatically and thus with high time savings with large amounts of training data. The evaluation tool can also include a system of neural networks.

For training purposes, it may be necessary that detection information according to an application technology (hereinafter referred to as: application data, in particular an input detection) and detection information according to a training technology (hereinafter referred to as: expert data, in particular a target recording) are available. The application data can also come from a different source than the expert data. It is also possible that the application and expert data contain information about the same sample and/or sample range. In particular, there is an information overlap in both. The application data can have such collection information, as they are also collected with an application system. The expert data may not be detected by the application system, or only in lower quality and/or at a slower rate. It is also conceivable that the expert data cannot or cannot be recorded in the same way in the application system, but possibly only in a training system. Both systems can be configured as detection systems, such as microscopes. The application data includes, for example, a stack of transmission images. The expert data, on the other hand, can be, for example, fluorescence images of the sample. By training, the evaluation tool can be trained to augment additional information from the expert data in the application data. In other words, the evaluation based on the application data without knowledge of the expert data can determine the result information, which then at least approximately contains the information of the expert data. This may also be possible if the application system detects this application data using the application technology without resorting to the training technology. The application technology is e.g. transmitted light microscopy and/or multicolor microscopy, in particular of living and/or unstained cells of the sample, and/or the like. The training technology is, for example, fluorescence microscopy and/or segmentation of the sample, in particular fixed and/or colored cells, and/or the like. Both the expert data and the application data can be recorded automatically without manual intervention (e.g. during training by the training system). Unlike the application system, the training system can use both the application technology and the training technology to collect the detection information. It can be crucial that the recording of expert and/or application data is performed at a sufficient speed to determine a sufficient amount of data for the training. The training can be performed on the basis of expert data (correspondingly as ground truth) and application data, e.g. in such a way that training information is determined by machine learning. This training information includes, for example, a classifier and/or a model and/or a weighting and/or a parameterization of the evaluation means, which can thus represent the result of the training. The training information can then be used by the evaluation tool (such as a computer program) in application systems to perform the training evaluation and/or to determine the result information on the basis of the application data determined by the application system. For this purpose, the evaluation tool is executed, for example, by an evaluation device such as a computer.

In particular, the method described is not limited to (classical) transmitted light microscopy as an application technology or training technology. For example, the application technology or training technology can also be configured as a flow cytometry. For cell analysis in flow cytometry, it may be intended that samples in a liquid are guided past an optical device consisting of detectors (e.g. sensors of a detection device) and/or illumination in order to obtain sample information (e.g. input recording and/or detection information). One advantage of this continuous relative displacement between the sample or cells of the sample and the optical detection device is the comparatively high sample throughput due to the possibility of continuously running the illumination and/or the image by the detector without any major technical disadvantages. In a microscopic setup for adherent cells, the advantage of lower acceleration forces is added, which plays a role especially in gentle life cell observation and the avoidance of vibrations of the sample liquid. For example, in transmission lighting methods, the latter can lead to irregular changes in illumination caused by surface waves, but can also have a mechanical effect on physiological development, especially in the analysis of living spheroids or organoids.

It may be possible that the inventive method is limited to microscopy, preferably transmitted light microscopy, as an application technology and/or training technology. In other words, the application technology and/or training technology can only relate to microscopy technologies and not, for example, to flow cytometry.

Traditionally, it is difficult to obtain structural information and/or images and/or analyses derived from such a continuously moving sample. In particular, the sample throughput is considerably reduced despite the greater parallelization by the detection device, if necessary using several sensors for detection. According to the invention, the advantage can be achieved here that the effort for this determination is reduced by the semi-skilled evaluation means, e.g. motion blur and/or noise is reduced by means of a neural network. Further neural networks of the evaluation means and/or further evaluation means can also be trained and used in the evaluation to determine structural information and/or images and/or analyses derived from them as additional information.

It may also be possible for the sample or cells of the sample to be continuously moved relative to the detection device and analyzed during the process in order to obtain a speed gain for image detection (input recordings and/or detection information) or sample analysis (based on the input recordings and/or detection information). In addition to flow cytometry, this can also be provided when using microscopy as an application and/or training technology. For this purpose, for example, flashlight illumination is used as illumination of the sample, and/or a linear sensor is used as at least one sensor of the detection device. In microscopy, such a procedure using camera sensors can be time-consuming because the movement of the sample has to be synchronized with the flash illumination and the camera recording, especially at high speeds. According to the invention, it can be an advantage here if an evaluation tool is trained to determine the additional information from detection information determined by less extensive lighting situations (e.g. without flashlight illumination and/or fewer sensors), which is provided by target recordings with the more extensive lighting situation.

This allows the sample to be continuously illuminated as well as continuously recorded unsynchronized, which can greatly reduce the demands on the technology and allows higher camera speeds to be achieved.

In addition, the continuous movement has the advantage that a fixed lighting pattern, e.g. a stripe pattern, can produce a resolution increase in the direction of movement in the sense of a structured illumination without the need for a further device to move the lighting pattern.

It is also conceivable that training may be performed, in particular, automatically on a type of sample with a specific color and/or recording method, in particular for the development of sample-specific assays and analyses. However, the use of conventional dedicated algorithms may be problematic. Machine learning methods, on the other hand, may be able to solve such problems as motion blur and/or noise more robustly than dedicated algorithms with a correspondingly extensive ground truth. High frame rate recordings of the sample can serve as expert data to train the evaluation tool (such as a neural network) to calculate motion blur and/or noise from a video at a lower frame rate than application data better than conventional methods.

The method can be performed by classical methods of motion blur correction, notwithstanding the advantages of calculating the motion blur and/or noise by training, but also on the basis of motion speeds, without foregoing the advantages of automated training by means of ground truth and increased speed by continuous recording on the evaluation systems.

The invention described here can be used to provide a system and/or a method which allows both automated training (in particular automated training of the image or analysis function) for a certain sample type using a training technology, if necessary also In Silico Labelling, in order to allow analysis of samples at high speed for a specific question on the sample type, preferably in a further recording type (application technology). The latter recordings or analyses can also be performed on technically simpler application systems which do not support the more complex training technology.

The so-called method of "In Silico Labelling" is described in the publication "In Silico Labeling: Predicting Fluorescent Labels in Unlabeled Images", Christiansen, Eric M. et al. Cell, Volume 173, Issue 3, 792-803 revealed. These are fluorescent markings performed by computer processing ("in silico"). It is conceivable that the input and/or target recording in a method according to the invention may show such fluorescent markings.

This may also have the advantage that microscopic image analyses can be mapped to optical (in particular camera-based) methods, which can be technically simpler, using methods that are conventionally only technically complex to implement. In particular, the evaluation tool (such as a neural network or a system of neural networks) can be configured so that it can be trained on expert data obtained by a training system, but can then be applied to technically simpler application systems. Due to the special training methods, it is thus also possible for the evaluation tool to perform corresponding analyses on a manual microscope by manual relative displacement of the sample. In contrast to conventional methods, the data can also be evaluated robustly during continuous displacement.

It is also conceivable that external neural networks could be used to supply expert data for evaluation and/or training purposes.

Advantageously, the sample can be configured as a cell sample, especially with adherent cells on tissue sections or in so-called microtiter plates (wellplates). These can be analyzed at very high speed and/or without mechanical problems, as invented, which can be caused by step-by-step execution in the case of mechanical vibrations or by inaccuracies in the direction and speed of movement in the case of manual movement of the sensor or sample(s).

Furthermore, it is optionally provided that the input detection differs from the target detection at least in that, during the input detection a, in particular relative movement (relative movement, e.g. relative to the detection system) of the sample, the input recording is affected, so that the training information is specific for at least a reduction of this influence and additionally for the determination of the additional information. The training for the reduction of this influence can take place, for example, by the fact that the evaluation means has a neural network or the like, which with the input recording (which has the influence) as application data and the target recording (which does not have the influence) is trained as expert data or ground truth. This results in an adaptation of the training information (e.g. as an adaptation of the neural network), which is specific for the reduction of this influence. In order to additionally enable the determination of the additional information by the training information, a further neural network or the like of the evaluation medium can be trained. For this purpose, for example, the further neural network or the like can be trained with at least one further input recording (without the additional information) as application data and at least one further target recording (with the additional information) as expert data or ground truth. All networks trained in this way can be linked together during the evaluation in order to perform the cascading evaluation. The adaptation of these neural networks can be provided in the evaluation information as one or more data sets in order to provide them in a simple way.

In the scope of the invention, it may preferably be provided that during the input detection and/or during the target detection, a step-by-step or continuous relative movement of the sample (in particular partially or fully) is performed, in particular relative movement of the sample, for which the training information is specifically trained. By incorporating the relative movement into the application data, the training can be reliably performed in order to take into account the movement during the evaluation. The training information is therefore specific, since it takes into account the movement in the application system-side evaluation.

In a further possibility it may be provided that, during input detection and target detection, a motorized (optionally fully) automated step-by-step or continuous, in particular relative, movement of the sample is performed, in particular for a multiplicity of objects of the sample and/or for a multiplicity of samples each to determine at least one input and target recording as training data for training, wherein automatically based on the target recording a ground truth or expert data for training is or are preferably determined, in particular by reference processing, preferably by automatic segmentation. Reference processing may be carried out, for example, by applying a thresholding method to the target recording in order to reliably and/or automatically perform, for example, cell masking (segmentation).

Furthermore, it is optionally provided that the target recording and/or the input recording each have recordings of the sample at the different sample positions, wherein preferably during the input recording and/or during the target recording during an automated, continuous or step-by-step, in particular relative, displacement of the sample performed in a motorized manner, position data about the sample positions are determined in order to assign the recordings to the sample positions on the basis of the position data. In this way, it is possible to implement a particularly fast and, in particular, continuous mode for recording the sample.

If the input and/or target detection and/or the application system-side detection takes place in continuous mode, it is conceivable that one or more input recordings and/or target recordings and/or detection information are acquired at least partially in parallel and/or simultaneously and/or sequentially at the at least one sample during, in particular relative, movement of the at least one sample. Different channels of the optical detection system can be used for this purpose, for example. It may also be for the various input and/or target recordings and/or recording information that recordings are made according to different technique and/or application and/or training technology. For example, transmission and fluorescence images can be determined at least partially at the same time. In addition, the records may be repeated for the respective input and/or target records and/or record information. In order to combine these repeated detects again for a corresponding recording and/or detection information, the current position data of at least one sample are simultaneously detected during the (relative) movement, for example. This enables, for example, a vast amount of training data to be determined at high speed.

It may also be possible that the input detection and the target detection are each performed as training system-side detection by an optical training system, wherein preferably the training information for the determination of the additional information on the basis of is specific to an application system-side detection information, which is determined by a subsequent application system-side detection (application system-side input detection) by an optical application system. In this application system-side detection, a (particularly manual) continuous sample relative movement can also be performed. Alternatively or additionally, the application system may be configured to provide the application technology, and the training system may be configured to provide the training technology (in addition to providing the application technology). This enables a reliable and fast determination of training data for the training.

It may also be possible that the evaluation means is configured as a computer program based on machine learning and/or artificial intelligence and/or deep learning, and preferably has one or more artificial neural networks, in particular according to a training hierarchy, wherein preferably a first of the networks is training to determine the additional information and at least a second of the networks is training to compensate for the continuous relative displacement of the sample. This allows extensive sample analyses to be performed in continuous mode. The training hierarchy refers in particular to a cascade report by the networks. To train the network to compensate for continuous sample displacement, it may also be possible to use a ground truth from stung fields of view from a step-by-step or flash generated image without motion blur and/or noise. In the case of a z-movement or a movement in several spatial directions, this ground truth might have to be extended by corresponding images from the z-planes.

Alternatively, a classical method can be used instead of the second network to compensate for the continuous relative displacement of the sample within the system. For example, here a conversion could take place by means of known motion speeds.

It is also possible for neural networks to be trained in parallel. For example, a first of the networks is trained in parallel to a second of the networks. Alternatively or additionally, a neural network, in particular in accordance with a "multitask training", can be trained in such a way that it provides several result information from the detection information (on the application system side) (e.g. at least one additional information and/or one further information, such as information about compensation for a continuous sample relative movement).

In a further possibility, it may be provided that, during training, several neural networks of the evaluation means for respective processing of the input recording are hierarchically trained, and, in particular, the evaluation means is trained by the training information for performing at least two sample analyses, to which in each case one of the specific neural networks of the evaluation means is assigned. In other words, the networks can be trained to perform the relevant sample analyses. Such sample analyses include, for example, segmentation and/or substance detection in the sample or the like.

It is also conceivable that the training technology and/or the application technology are each configured as microscopy technologies, in particular for transmitted light microscopy, preferably that the training system and/or an application system are each configured as microscopes, preferably for flow cytometry.

It is also advantageous if, in the context of the invention, at least one detection device and at least one lighting means (such as at least one light source) of a training system are used for input and/or target detection (in each case or jointly), wherein
  in the input detection the sample is continuously or step-by-step moved in a first detection mode and/or with a first illumination level relative to the training system, in particular detection optics (or also imaging optics), over more than one entire detection field of the detection device in order to obtain the input recording of an area of the sample, the target detection at least partially detects the same area of the sample in a second detection mode and/or with a second illumination level to obtain the target recording, preferably wherein the second detection mode and/or the second illumination level is different from the first detection mode or the first illumination level, respectively, a ground truth is determined from the target record during training and application data (target data) is determined from the input record, which application data (target data) is used for training at least a first neural network (of the evaluation means) in order to determine the training information, optionally: training (teaching) at least one further neural network (of the evaluation means) by means of the first neural network in order to determine the training information which is specific for a neural network system of all trained neural networks (of the evaluation means), applying the evaluation means (60) with the training information (200) to an application system (5) for application system-side detection (101') in the first recording mode and/or with the first illumination level, wherein the detection is used, in particular to obtain application system-side detection information (110'), for this preferably at least one sample (2) is being continuously displaced over more than one entire detection field of a further detection device (40) of the application system.

The recording mode can be, for example, a continuous or step-by-step or manual mode of the sample relative movement. The recording mode and/or illumination level can also be set according to a training or application technology.

For example, it can be provided that the method steps of a method according to the invention for input and target detection, and in particular also for the application system-side detection, of different samples and/or objects of the sample are performed completely automatically, so that any manual intervention can be performed. This enables a particularly fast detection of the sample.

For continuous recording, a tracking system can also be used for continuous motorized tracking of the position of the sample, in particular the relative optical z-position between the sample and the detection device (in particular the detection sensor). An advantageous execution is, for example, a method which has been learnt for this purpose, which, from the training of z-stacks (several sample recordings in z-direction, i.e. for different depths of the sample) and the ground truth of the corresponding focused positions within the z-stacks, tracks a motorized z-drive of the objective in such a way that during a continuous displacement the sample is always kept at a constant optical distance from the detection system.

In another possibility, it may be provided that during input and target detection, and in particular also during application system detection, different depths of the sample are acquired, so that the input recording and/or target recording has a stack (z-stack) of images of the sample (for different sample positions in the axial z-direction). Just like a lateral relative displacement of the sample (in x and/or y direction), a continuous relative displacement of the sample can also be provided orthogonally in the z direction.

A particularly advantageous configuration of an application-side detection information system is an optical configuration on the detection side of the detection system which allows simultaneous imaging of different z-planes (i.e. depth planes of the sample) on a sensor (the detection device). This could be done, for example, by a sensor tilted to the optical plummet. Through the continuous movement, the sample can then be detected both in different z-planes and at different points of the optical system with different optical properties, whereby the different sample sections detected through this process preferably experience the same optical detection conditions due to the displacement in the z-planes. A further advantage of this configuration is the reduced requirements for a focus tracking of the system in z-direction. The sensor can be configured as a monochrome camera sensor, a polarization resolving camera sensor or an RGB camera sensor, whereby in the latter cases a polarization coded or color-coded illumination can provide additional information about the sample.

Furthermore, it is possible within the scope of the invention that during input and/or target detection and/or during application system-side detection (of the application system) different depths of the sample are acquired, so that preferably the input recording and/or the target recording and/or (application system-side) detection information of the application system-side detection has a stack with receptacles of the sample for axial sample positions.

Alternatively or additionally, it is possible that the different depth(s) of the sample are detected by imaging, in particular by the application system (and/or the training system), sample areas of the different depths (depth areas) onto different areas of a sensor of a detection device of the application and/or training system. This allows different positions of the sample in the z-direction (depth direction of the sample) to be imaged on the sensor simultaneously. In order to detect further positions of the sample, the relative displacement of the sample can also be performed, in particular as a continuous displacement, while further observations are performed. In order to enable the simultaneous imaging of the different depth ranges, the sensor can preferably be inclined with respect to an optical axis in the application system (or training system), in particular to a perpendicular of the optical axis. The imaging can also be enabled by adapting the imaging optics of the application system (or training system) accordingly. In particular, the sensor is configured as a surface sensor and/or camera sensor.

It is also conceivable that the input detection and/or target detection and/or further target detection and/or further input detection for training may be performed simultaneously or at different times for different sample positions by different channels of the training system.

It may also be possible that the evaluation tool is adapted by the training information to analyze at least one of the subsequent samples:

adherent cells on tissue sections,
samples on a microtiter plate,
colored cells,
uncolored cells.

A further advantage within the scope of the invention can be achieved if the additional information (or result information), and/or a ground truth for training an evaluation means, is one of the following information about the sample:

a detection, in particular segmentation or localization of objects and/or cells of the sample, in particular a segmentation mask, an estimate of the classification or regression of pixels or objects or sample areas of the sample, a cytometric or histological analysis result (e.g. for ground truth, obtained with established methods of sample analysis, e.g. high content analysis), a phase information (e.g. for the ground truth from a complementary, established method of phase measurement), a three-dimensional information about the spatial structure of the sample (e.g. the ground truth is a z-stack image), at least one fluorescence property of the sample (e.g. the ground truth is at least one fluorescence image of the sample), an extended depth-of-field range of a sample recording (e.g. ground truth is a corresponding image with an extended depth-of-field range of the sample).

Another object of the invention is a system for providing an evaluation means for at least one optical application system of a microscope-based application technology, in particular in accordance with a method according to the invention:

at least one detection device for performing an input detection of at least one sample in accordance with the application technology, in order to obtain at least one, in particular digital input recording of the sample on the basis of the input detection, the or at least one further detection device for performing a target detection of the sample in accordance with a training technology in order to obtain at least one, in particular digital, target recording of the sample on the basis of the target detection, wherein the training technology preferably differs from the application technology at least in that the training technology is configured to provide additional information about the sample, an evaluation device for training the evaluation means at least on the basis of the input recording and the target recording in order to obtain training information of the evaluation means, a sample moving device, such as a motorized sample table, for (lateral and/or axial) relative or direct displacement of the sample in order to automatically detect various sample positions during input detection and/or target detection, so that, in particular, the training information for a continuous relative displacement of the sample (in particular for the application system) for determining the additional information is learned.

Thus, the inventive system has the same advantages as those described in detail with regard to an inventive method.

It is possible that the training technology may differ from the application technology in terms of the detection device and/or detection technology and/or illumination device and/or illumination technology used.

Another object of the invention is a computer program, preferably a computer program product, comprising instructions which, when the computer program is executed by a computer (such as an evaluation device), cause the computer to determine additional information about a sample on the basis of at least one input recording of the sample and on the basis of training information. In particular, it is provided that the input recording is specific for an input detection of the sample according to an application technology and/or the training information is determined according to an inventive method. Thus, the computer program according to the invention has the same advantages as those described in detail with regard to a method according to the invention. In addition, the computer program may be capable of being non-volatilely stored in a data storage of an evaluation device, preferably an inventive system. The computer program may, for example, be produced by a process in accordance with the invention.

Also protected is a computer program, preferably a computer program product, in particular means of evaluation, produced by a method in accordance with the invention, so that the computer program contains the training information.

A computer program, preferably a computer program product, is also protected which has instructions which, when the computer program is executed by a computer (such as an evaluation device), cause the computer program to execute the steps of a method in accordance with the invention. In addition, the computer program may be capable of being non-volatilely stored in a data storage of an evaluation device, preferably an inventive system.

Each of the computer programs can, for example, be read from the data storage by a processor of an evaluation device and then executed by the processor. For example, any of the computer programs may be capable of controlling a sample movement device for sample relative displacement, and in particular of acquiring and/or storing the position data of the sample.

Each of the computer programs and/or a computer-readable medium with the computer program can be non-transitory.

A computer-readable medium is also the subject of the invention. It is provided that one of the computer programs in accordance with the invention is stored on the computer-readable medium. Thus, the computer-readable medium according to the invention has the same advantages as described in detail with regard to a computer program according to the invention. The computer-readable medium may, for example, be configured as a hard disk and/or non-volatile data storage and/or flash storage and/or firmware and/or downloadable program or the like.

Figure 2:
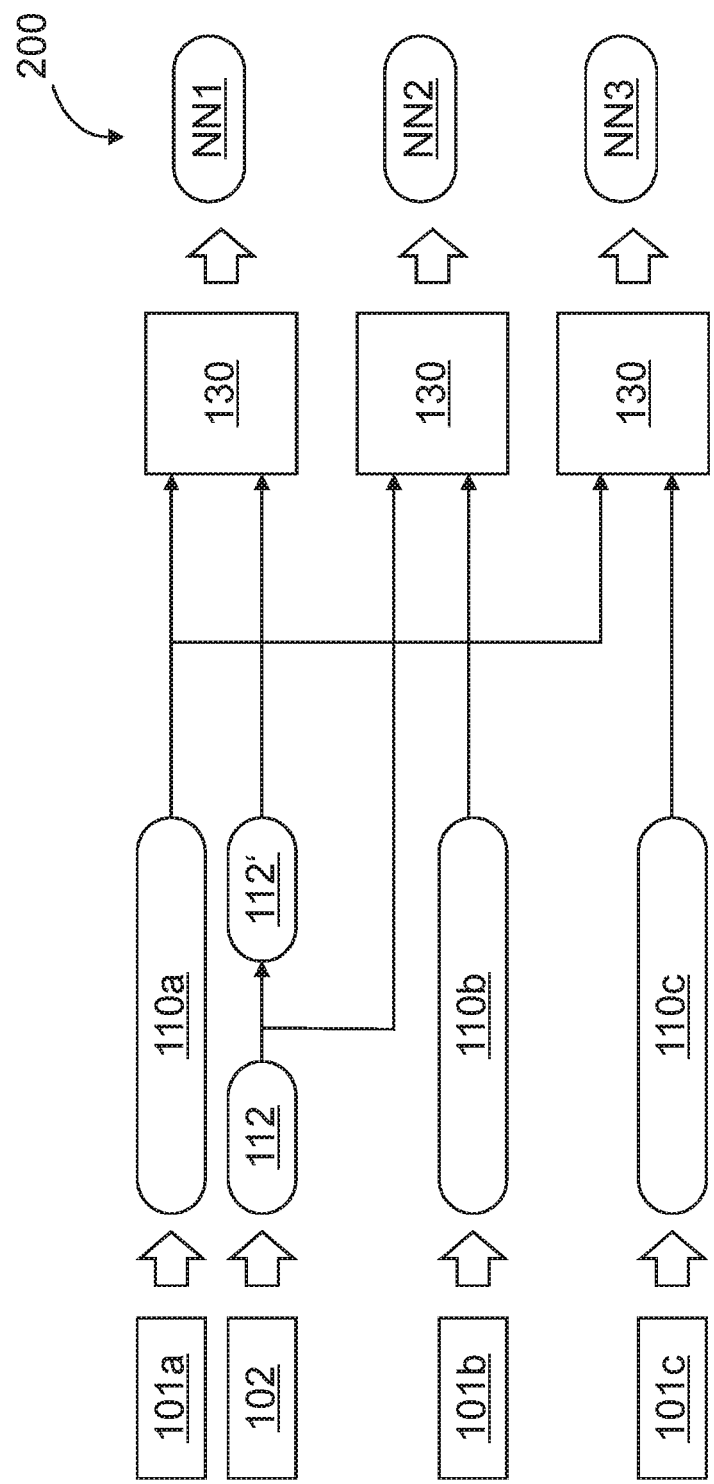
Figure 3:
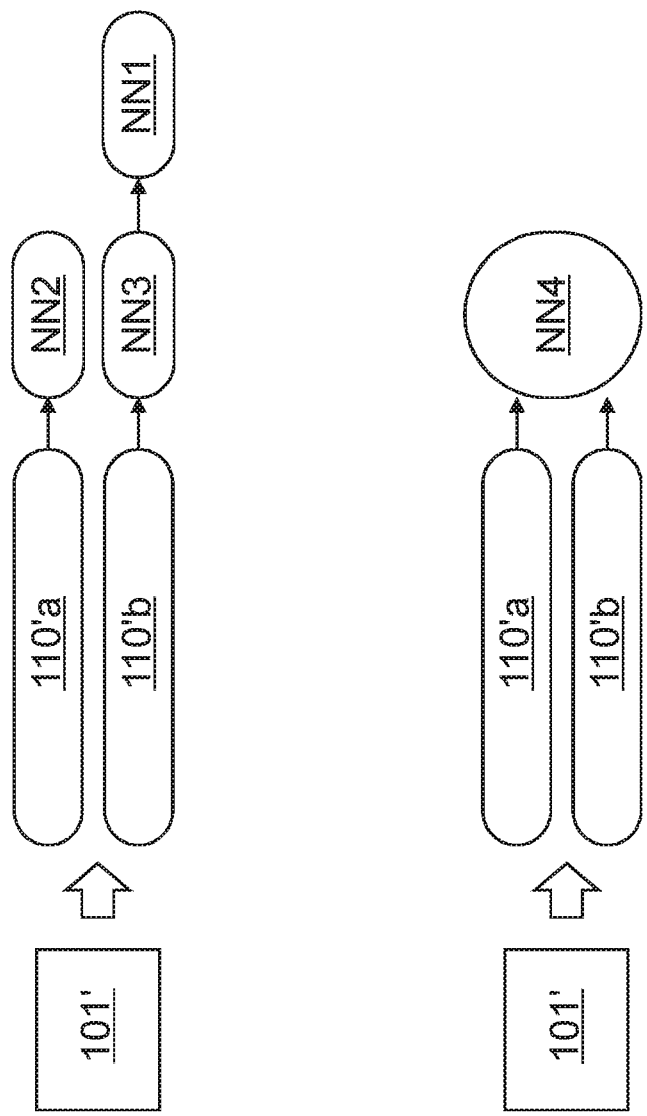
Figure 4:
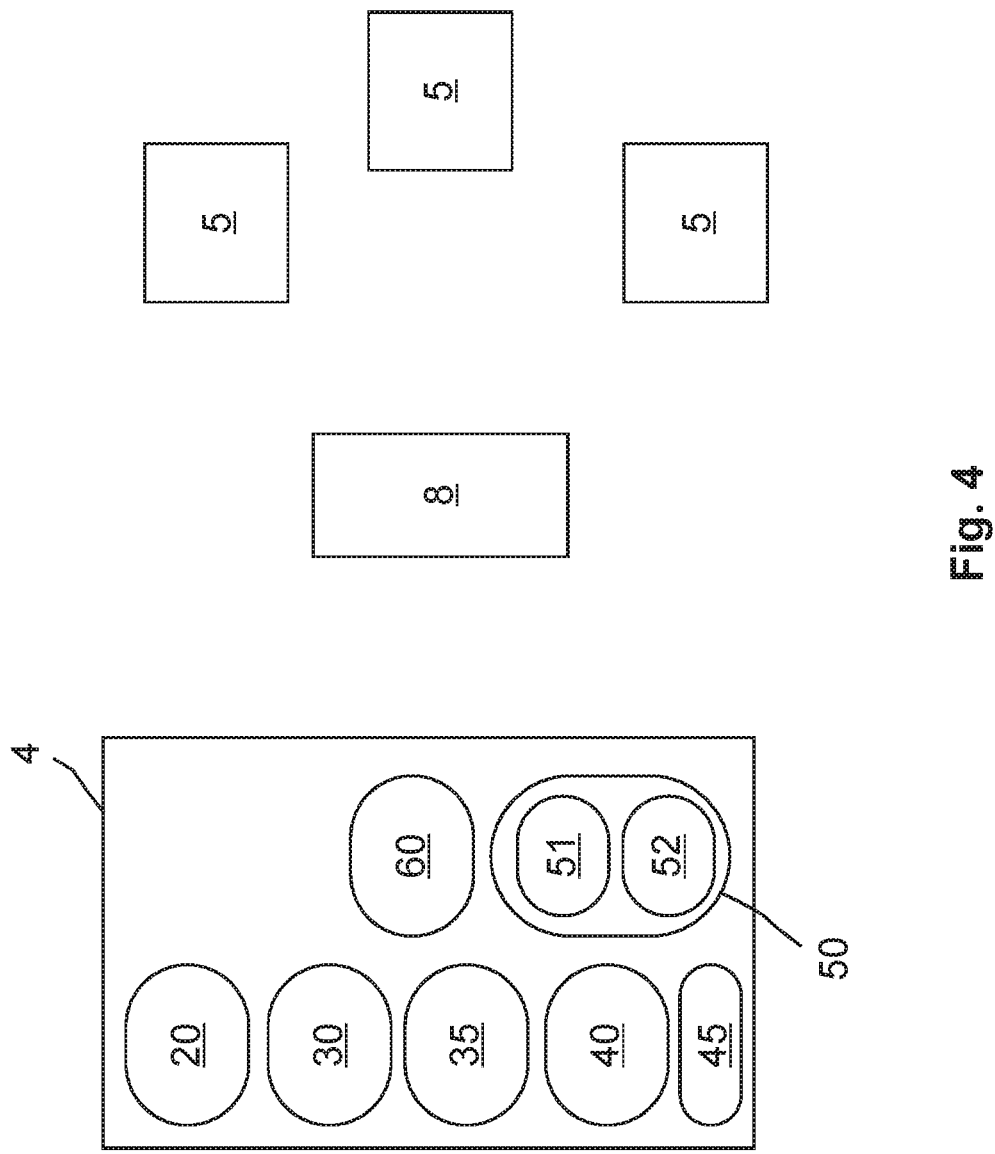
Figure 5:
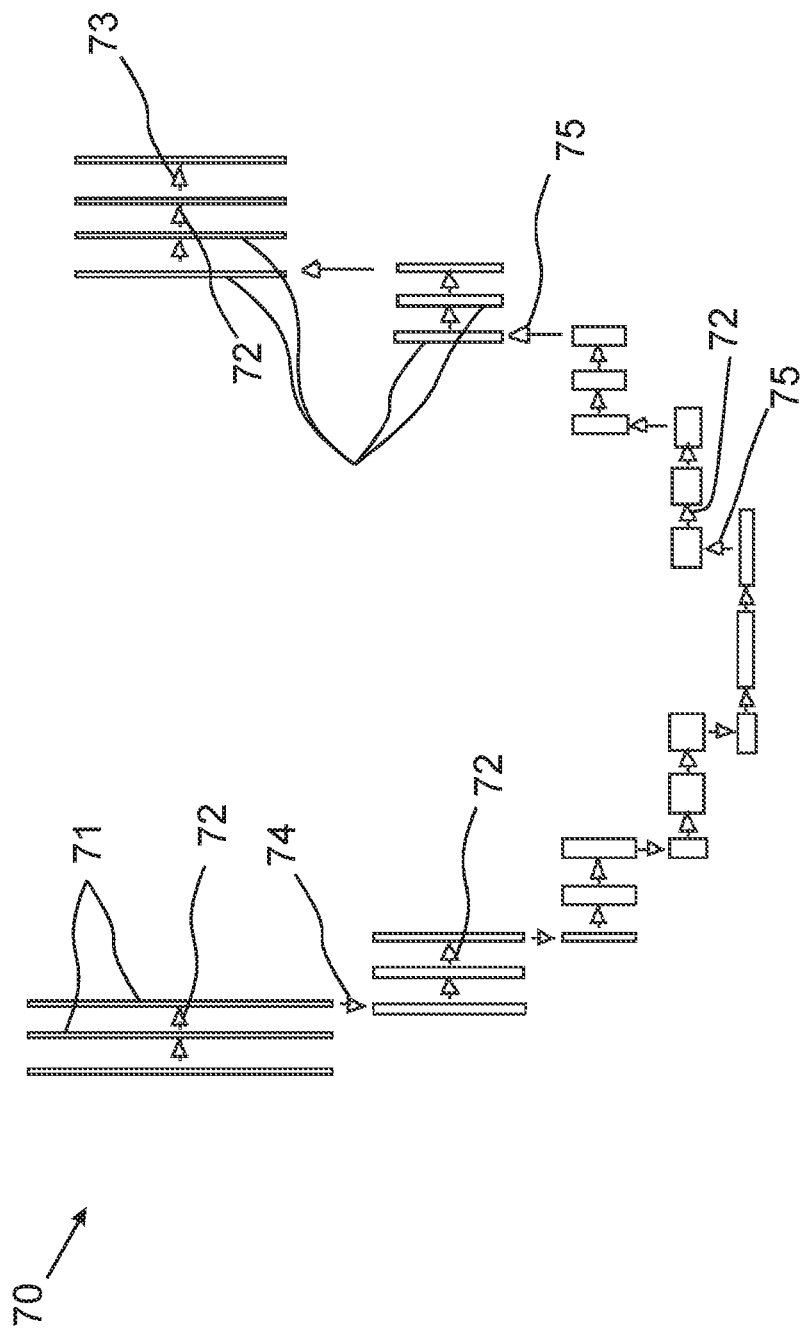

Further advantages, features and details of the invention result from the following description, in which embodiments of the invention are described in detail with reference to the drawings. The features mentioned in the claims and in the description may be essential to the invention either individually or in any combination. Show it:

FIG. 1 A schematic representation for the visualization of a method according to the invention, FIG. 2 An additional schematic representation for the visualization of a method according to the invention, FIG. 3 An additional schematic representation for the visualization of a method according to the invention, FIG. 4 A schematic representation of a system according to the invention, FIG. 5 An optional version of parts of an evaluation medium.

In the following figures, the identical reference signs are used for the same technical characteristics, even for different embodiments.

FIG. 1 visualizes a method according to the invention for providing an evaluation means 60 for at least one optical application system 5 of a microscope-based application technology.

The application technology is, for example, a microscopy technique such as transmitted light microscopy, reflected light microscopy, flow cytometry or the like.

In order to carry out the provision of evaluation medium 60, this can first be trained by an optical training system 4. For this purpose, in accordance with a first method step, an input detection 101 of at least one sample 2 is performed in accordance with the application technology in order to obtain at least one input recording 110 of the sample 2 from the input detection 101. The microscopy technology used in training system 4 is thus essentially the same as or at least similar to the application technology of application system 5, i.e. the sample detection for both systems 4, 5 has common characteristics or properties relevant for sample evaluation. Furthermore, several samples 2 can always be detected or several objects of a single sample 2 can be detected.

A target detection 102 of sample 2 is then performed according to a training technology in accordance with a second method step in order to obtain at least one target detection 112 of sample 2 from the target detection 102. The training technology may differ from the application technology at least in that additional information 115 on sample 2 is provided.

The input recording 110 and target recording 112 can also be interpreted as training data (or training data). The input recording 110 and target recording 112 can also each have at least one image information about sample 2, possibly also about several samples 2 and/or different and possibly overlapping areas of samples 2.

As a third method step, a training 130 of the evaluation means 60 is provided, which is performed at least on the basis of the input recording 110 and the target recording 112, in order to obtain a training information 200 of the evaluation means 60. The evaluation means 60 learned in this way can be adapted to determine 200 output data from input data on the basis of the learned training information. For example, the input data are executed according to (at least approximately) the input recording 110 and/or the output data are executed according to (at least approximately) the additional information 115, and in contrast to these are acquired in the application system 5. The application system 5 can also be used spatially separated and/or self-sufficient from the training system 4. Distribution 140 may therefore be necessary as an intermediate step, e.g. via a cloud system 8 shown in FIG. 4. Distribution 140 preferably comprises data exchange and/or non-volatile storage of training information 200 in a database of the cloud system 8.

According to the invention, it can be advantageous that during the input detection 101 and/or during the target detection 102 different sample positions of a large number of samples 2 are automatically acquired. This enables a particularly fast and automated recording of the training data for the training to be provided, so that the training can take place particularly reliably and without complex manual interventions on the basis of a large amount of data.

A further advantage can result from the fact that by recording the different sample positions the training information 200 for a continuous sample relative movement of at least one sample 2 is trained to determine the additional information 115. This enables to use a continuous sample relative movement in an application system-side detection 101' during the later application of the semi-skilled evaluation means 60 to determine application system-side detection information 110' from the application system-side detection 101'. The application system detection 101' corresponds methodically completely or approximately to the input detection 101, at least to the extent that an application technology is also used. If necessary, the continuous sample relative movement can be used for both input detection 101 and application system detection 101' or only for application system detection 101'. In any case, in accordance with this advantageous further development of the invention, the evaluation means 60 is adapted to be able to use the application-system detection information 110' as input data in order to at least approximately determine the additional information 115 as output data on the basis of this input data and on the basis of the training information 200 by evaluating 120 as output data. The training information 200 can be trained to take into account the special features of continuous sample relative displacement. In this way, a particularly fast and effective sample recording can be performed by the application system.

It may be possible that the special features of the continuous sample relative displacement are taken into account during training 130 (and thus, for example, in addition to the evaluation 120 for providing the additional information 115, the evaluation 120 of these special features is also learned). For this purpose, the input detection 101 may differ from the target detection 102 at least in that during the input detection 101 the input detection 110 is influenced by a continuous or step-by-step relative movement of the sample 2. This means that the training information 200 can be specific (trained) for at least reducing this influence and additionally for determining the additional information 115. For example, this can affect a reduction in motion blur and/or noise. In other words, when 101 is input and/or 102 is target, a fully automated step-by-step or continuous (relative) movement of sample 2 can be performed, for which the training information 200 is specifically trained.

A particularly fast sample detection can result if a fully automated step-by-step or continuous, in particular relative movement of sample 2 is performed motorized during input detection 101 and/or target detection 102, in order to determine at least one input and target detection 110, 112 each for a multiplicity of objects of sample 2 and/or for a multiplicity of samples 2 as training data for training 130. On the basis of the target recording 112, a ground truth can then be determined automatically for training 130, in particular by reference processing, preferably by automatic segmentation. Furthermore, the target record 112 and/or the input record 110 may each contain records of sample 2 at the different sample positions. During the motorized automated continuous or step-by-step (relative) movement of sample 2, position data can be determined about the sample positions during input detection 101 and/or position data can be determined during target detection 102 in order to assign the recordings to the sample positions on the basis of the position data. This can also include, for example, a "stitching" of the sample images taken in the process.

As shown in FIGS. 2 and 3, the evaluation means 60 may have one or more artificial neuronal networks NN1, NN2, NN3, NN4 according to a training hierarchy, wherein preferably at least a first NN1 of the networks is trained to determine the additional information 115 and at least a second NN2, NN3 of the networks is trained to compensate the continuous sample relative movement. For example, when training 130, several neural networks of the evaluation medium 60 can be trained hierarchically for each processing of the input recording 110. In particular, the evaluation means 60 is trained by the training information 200 for performing at least two sample analyses, to which in each case one of the neural networks of the evaluation means 60 specify therefor is assigned. Each of the neural networks can be defined on the basis of a respective training information 200.

FIG. 3 schematically shows another exemplary training approach of the invention. The training of the evaluation medium 60 is performed by marking cells or cell compartments of sample 2 with a fluorescence staining specific for a sample analysis. This staining can be used as the basis for a target detection 102 of this sample 2 according to the training technology to determine the target detection 112. It is also conceivable that further processing, such as automated segmentation (e.g. by thresholding the fluorescence signals), of the target recording 112 is performed in order to use the resulting segmentation information 112' (such as segmented areas of sample 2) as ground truth. For example, only the masks of certain cell areas or cells are used as ground truth in order to increase the specificity of the evaluation medium 60 with regard to the desired sample analysis. Subsequently, a first part of the evaluation tool NN1, in particular a first neural network NN1, can be trained. In particular, NN1 is automatically trained to find correlating areas in the detection information 110' of the application system in a marker-free imaging method, such as transmission imaging, as an application technology. To do this, the first input recording 101a with the application technology is used to obtain a first input recording 110a.

In a further step, additional external neuronal networks of other types can optionally be used in order to increase the specificity of the cell analysis with regard to other sample properties.

Advantageously, an automated movement of sample 2 relative to training system 4 can take place during a first input detection 101a and/or a second input detection 101b and/or a third input detection 101c and/or a target detection 102. With the second and third input detection 101b, 101c this movement can also be performed continuously, in the other cases e.g. step by step. Other motion patterns are also conceivable (such as random motion or movement of the sample on a disc to avoid acceleration peaks through spiral continuous motion). For example, a first input record 110a and a third input record 110c are records according to a first technique of an application technology, e.g. transmission images. Preferably, a second 110b input recording is performed according to a second technique of an application or training technology, e.g. fluorescence microscopy. The target recording 112 is optionally also a fluorescence recording (if necessary different) or contains additional information if necessary. The target recording 112 or a further processing based on it 112' can be used as ground truth for the training of a first part of the evaluation means, in particular the neural network NN1. Furthermore, the target recording 112 can be used as ground truth for training a second part of the evaluation tool (in particular neural network) NN2, in particular using the second input recording 110b. In addition, the first input record 110a can serve as a ground truth for training a third part of the evaluation tool (in particular neural network) NN3 using the third input record 110c. NN2 and NN3 are thus trained to take continuous movement into account.

A preferred next step in training is shown below to allow sample detection speeds above the critical frame rate in the manually moved or motorized continuous mode of sample relative movement. For this purpose, the motion blur and/or interference influences such as noise can be calculated out by means of evaluation using evaluation means 60. For example, the first input detection 101a is first performed classically step by step and, if necessary, the resulting images are stitched in order to generate an input detection 110a. This can be used to train the evaluation tool 60 in such a way that the continuously recorded data of the second input recording 110b are freed from motion blur and/or interference influences.

FIG. 3 shows that on the basis of the evaluation by this evaluation tool 60 for the reduction of motion blur and/or noise, another evaluation tool 60 can be trained, if necessary, to determine the additional information 115 directly from an application system detection information 110'.

This application system side detection 110' information can be performed by application system side detection 101' in continuous mode. The application system detection information 110' may also include a first detection information 110'a and a second detection information 110'b which have been acquired in accordance with application technology techniques. A first technique is, for example, a fluorescence microscopy (possibly different from a more technically complex fluorescence microscopy of the training technology and/or without segmentation information or other information about the sample) and a second technique is a transmission microscopy. According to the trained parts of the evaluation tool NN1, NN2, NN3, the additional information 115 can then be determined at least approximately, especially if the motion blur is reduced at the same time. Alternatively, another fourth part of the NN4 evaluation tool (in particular the neural network) can also be trained in such a way that it directly determines the desired additional information 115 at least approximately.

Possible combinations of application technology techniques and/or possible combinations of application and training technology are e.g. transmission and fluorescence, multicolored e.g. RGB images and confocal fluorescence images, stacks of multicolored images as well as three-dimensional data from multiphoton images, the latter e.g. to train also three-dimensional data and to obtain from it application-side detection information 110'. Furthermore, when using a continuous mode, continuous (in particular relative) movements in the z-direction of sample 2 can also be trained in order to train manual traversing in the z-direction by e.g. the detection device 40 and/or imaging optics 20 of the application system 5 when executing the input detection 101' on an unmotorized system on the application system side. Likewise, randomized continuous (relative) movements in the z-direction and orthogonal x-y-directions (lateral to the sample) could be trained in order to obtain a higher specificity later with the use in manual mode (i.e. non-motorized manual effect of a (relative) movement of sample 2 relative to the application system 5 or vice versa). For example, an additional indicator for specificity in manual mode can be automatically developed from this to generate feedback for a user for the manual (relative) movement.

FIG. 4 schematically shows an exemplary system for providing an evaluation means 60 for at least one optical application system 5 of a microscope-based application technology. The system is preferably configured as an optical recording system, especially training system 4. The system may comprise at least one detection device 40 for performing an input detection 101 of at least one sample 2 according to the application technology in order to obtain at least one input recording 110 of the sample 2 from the input detection 101. In addition, the or an additional detection device 40 may be configured to perform a target detection 102 of sample 2 according to a training technology. This serves to obtain at least one target recording 112 of sample 2 by means of target detection 102. The training technology may differ from the application technology at least in that the training technology is configured to provide additional information 115 on sample 2, such as fluorescence information or segmentation or classification of sample 2.

The at least one input record 110 and/or the at least one target record 112 can also be determined (sequentially or at least partially simultaneously) via a plurality of channels 35 of the system. These use, for example, an unrepresented beam splitter and/or a dichroic filter or the like in order to transmit the light altered by a sample 2 to different sensors of the detection device 40 (or also to another detection device). The transmission takes place, for example, depending on at least one property of the light, such as a light color and/or polarization and/or the like. In this way, for example, a transmission channel can be used for input recording 110 and a fluorescence channel for target recording 112. For illumination, for example, one or more light sources 30 can be used as illuminant 30, e.g. to generate laser light or broadband light, and/or imaging optics 20 can influence the light generated accordingly, e.g. with regard to light color or polarization for transmission.

Furthermore, an evaluation device 50 can be provided for training 130 the evaluation means 60 at least on the basis of the input record 110 and the target record 112 in order to obtain training information 200 of the evaluation means 60.

In addition, a sample movement device 45 of the system for (relative or direct) displacement of the sample 2 can be used to automatically detect different sample positions 101 during input detection and/or different sample positions 102 during target detection, so that, in particular, the training information 200 for continuous sample relative displacement for determining the additional information 115 is trained. The evaluation means 60, for example, is executed as a computer program which has instructions which, when the computer program is executed by an evaluation device 50 such as a computer 50, cause the computer to determine the additional information about the sample 2 on the basis of the input recording 110 of the sample 2 and on the basis of the training information 200. The input recording 110 can be specific for the input recording 101 of sample 2 according to the application technology and the training information 200 can be determined according to an invention method. The evaluation device 50 may have a processor 51 for executing the evaluation means 60 which is provided with a data storage 52, such as a computer-readable medium (e.g. a hard disk and/or a non-volatile storage and/or a flash storage and/or the like).

In order to provide the trained evaluation medium 60, the training information 200 can then be transferred to a cloud system 8 or a local data storage or similar. The training information 200 can then be distributed to one or more application systems 5 in order to carry out an application system-side detection 101' there with the trained evaluation means 60 (i.e. on the basis of the training information 200).

The following explanations describe further embodiments and further developments of the invention on the basis of FIG. 5, purely optional, and are therefore to be understood without restriction of the doctrine according to the invention.

The evaluation tool 60, i.e. in particular the neural network, can be configured as a convolutional neural network (CNN "folding neural network"), preferably as a so-called "fully convolutional network", as it is in Long, J.; Shelhamer, E.; Darrell, T. (2014). "*Fully convolutional networks for semantic segmentation*". arXiv:1411.4038 (Ref. 1), and preferred as a U-Net, as described in Ronneberger, Olaf; Fischer, Philipp; Brox, Thomas (2015). "U-Net: Convolutional Networks for Biomedical Image Segmentation", *MICCAI 2015: Medical Image Computing and Computer-Assisted Intervention—MICCAI* 2015 pp 234-241, see also arXiv: 1505.04597 (Ref. 2). A possible execution of a network structure and/or the training and/or the application of the network in the invention can thus essentially correspond to the aforementioned literature or the publication of an implementation in this context by the authors (see e.g. "https://lmb.informatik.uni-freiburg.de/people/ronneber/u-net/"). In other words, according to the invention, a known neural network can be used at least substantially unchanged, and thus the production of the training data sets (i.e. the training information or application data) and/or the training (i.e. training 130) of the neural network with the training data sets and/or which takes place in a conventional way. With regard to the inventive solution, the present description therefore reveals such steps which deviate from the known training and application steps of machine learning. A possible structure of the network according to the U-Net is shown in FIG. 5.

Further optional structures of the network and possible applications are listed below. For example, the U-Net can be used (in particular for the application of semantic segmentation) (see Sevastopolsky, "Optic Disc and Cup Segmentation Methods for Glaucoma Detection with Modification of U-Net Convolutional Neural Network", https://arxiv.org/abs/1704.00979), for an image classification e.g. the U-Net method described in Szegedy et al, "Rethinking the Inception Architecture for Computer Vision", https://arxiv.org/abs/1512.00567 (see also Gulshan et al., "Development and Validation of a Deep Learning Algorithm for Detection of Diabetic Retinopathy in Retinal Fundus Photographs", JAMA. 2016; 316(22):2402-2410. doi:10.1001/jama.2016.17216, https://jamanetwork.com/journals/jama/article-abstract/2588763 and Esteva et al, "Dermatologist-level classification of skin cancer with deep neural networks", Nature volume 542, pages 115-118, 2 Feb. 2017, http://www.nature.com/nature/journal/v542/n7639/full/nature21056.html) and for an instance segmentation a network structure according to Ronneberger, "U-Net: Convolutional Networks for Biomedical Image Segmentation", https://rd.springercom/chapter/10.1007/978-3-319-24574-4_28; He et al., "Mask R-CNN", https://arxiv.org/abs/1703.06870; Bai et al., "Deep Watershed Transform for Instance Segmentation", https://arxiv.org/abs/1611.08303.

Further examples of the structure of the method are described in Redmon et al., "YOLOv3: An Incremental Improvement", https://arxiv.org/abs/1804.02767 (particularly for detection) and (particularly for an image regression) Ounkomol et al., "Label-free prediction of three-dimensional fluorescence images from transmitted-light microscopy", https://europepmc.org/articles/pmc6212323; Christiansen et al., "In Silico Labeling: Predicting Fluorescent Labels in Unlabeled Images", https://www.ncbi.nlm.nih.gov/pmc/articles/PMC6309178/ and Weigert et al., "Content-aware image restoration: pushing the limits of fluorescence microscopy", https://www.nature.com/articles/s41592-018-0216-7. Further for possible structure of methods it is assigned to Jing et al., "On the Automatic Generation of Medical Imaging Reports", https://arxiv.org/abs/1711.08195 (for a text prediction) and Veta et al., "Cutting out the middleman: measuring nuclear area in histopathology slides without segmentation", https://arxiv.org/abs/1606.06127 (for a Multi-pixel Regression).

The following describes an optional network architecture for the neural network with further details. A CNN proved to be particularly suitable. This can be suitable for processing inputs in the form of a matrix, and thus also images represented as a matrix. The respective image can be defined e.g. as an image file by several pixels. For example, the number of pixels in the width of a given image can range from 8 to 2048, preferably 16 to 1024, preferably 32 to 512. The number of pixels in the height can also be within the above ranges, and one or more color channels can be provided. The number of neurons in the input layer can correspond to the number of pixels in the image that are passed to the network as input. The total number of neurons in the network can also result from the number of pixels used as input for further layers of the network. Specifically, the network can have one or more convolutional layers, which can be followed by a pooling layer (also called aggregation layer). The convolutional layers and the pooling layers can also be arranged alternately repeatedly. After that, a fully connected layer can be optionally connected, but can also be omitted (as in the case of a fully convolutional network and especially U-Nets). One or more filter kernels (convolutional matrix) can be provided for each convolutional layer, each with a specific matrix size (pixel size), e.g. 2×2 or 3×3.

The activity of each neuron can be calculated by a discrete convolution, e.g. by moving the filter kernel step-by-step over the input. The inner product of the filter kernel can be calculated with the currently underlying image section. This application of the filter kernel results in a result matrix (also called "feature channel" or "feature map"). The size of the result matrix can depend on the filter size (kernel size), any padding used and the step size used. The mentioned parameters can also be determined depending on a desired value of the size. The number of result matrices (or characteristic channels) can result from or correspond to the number of filter kernels. The size of the result matrix can also be changed for subsequent layers using the pooling layer (so-called up- or downsampling). With a maxpooling layer, for example, the highest value of the result matrix is used and all others are discarded. maxpooling is very widespread, whereby, for example, only the activity of the most active (hence "Max") neuron is retained for further calculation steps from each 2×2 square of neurons in the convolutional layer. The number of filter kernels can also change. The results of each layer can also be activated by an activation function such as a ReLu (rectified linear unit) function. The ReLU function can be defined as a function where any value less than zero becomes zero and the other values greater than zero are retained.

According to another concrete example, an input recording 110 can be used as input, which is executed as a two-dimensional image. With several color channels of the input recording 110, a 3D matrix can be determined from the input recording 110. A first convolution according to a first convolutional layer can be applied to this matrix. The number of neurons used in this step can be equal to the number of pixels in the matrix.

An optional further development of the network structure 70 can be illustrated as shown in FIG. 5 and described below. For a better overview, the elements described below are only partially marked with reference signs. The net structure 70 may have a contracting path (see left half of net structure 70 in FIG. 5) and an expansive path (see right half of net structure 70 in FIG. 5). Due to the high number of characteristic channels 71 in the expansive path, the U shape of the network structure is 70 (see Ref. 2). The contracting path may correspond to the typical architecture of a CNN. It may initially comprise a repeated application of two 3×3 convolution 72 (convolutions), in particular unpadded and/or with 64 filter kernels and/or each followed by an activation function such as a ReLu (rectified linear unit, e.g. f(x)=max (0, x) with x as input value of the artificial neuron), and then a 2×2 max pooling operation 74 in the subsequent step for downsampling. In FIG. 5 the arrows pointing to the right visualize the folds 72, 73 and the arrows pointing down visualize the Max-Pooling 74. Each of the folds 72, 73 up to the last fold 73 can be executed as 3×3 folds 72. The sequence described can then be repeated, whereby the number of feature channels 71 is doubled with subsequent downsampling steps 74. The rectangle (partly marked with 71) visualizes only one feature channel 71 representative for several feature channels. So, after each downsampling 74 the feature channels 71 can be doubled (e.g. first of 64 for the first two folds, then 128 for another two folds, then 256 for another two folds, then 512 for another two folds and finally 1024). Afterwards an upsampling can take place in the expansive path (e.g. by an initial 2×2 convolution 75 ("up-convolution") or by an interpolation). The upsampling steps 75 are each indicated by an arrow pointing upwards. Then two 3×3 folds 72 can be made again, each followed by the activation function or the ReLU. This sequence can also be repeated, whereby the number of feature channels can be halved for each 75 upsampling. The network can have a total of 23 convolutional layers. The segmentation (or another trained result, i.e. the result information and/or additional information 115) can then result from the last two result matrices. For other applications, it is conceivable that more than two result matrices are planned. FIG. 5 shows a schematic representation of the net structure 70, whereby some operations (e.g. a copy and crop) may be provided, even if they are not explicitly shown.

Furthermore, according to the optional configuration variant, the concrete network architecture is secondary if a relatively high number of training data sets is used. In other words, the network structure can be interchangeable, and does not need to be further adapted if a large number of data sets (i.e. images) are used. Augmentation can also be dispensed with in this case. The training in turn can also be done in the conventional way. For example, a backpropagation is used for this. In concrete terms, the training can take place, for example, as described in Ref. 2. As input, recorded images and e.g. associated segmentation cards can be used. An optimization method such as a gradient method ("Stochastic gradient descent") can be used. The inertia term (momentum) can be set high (e.g. 0.99). The energy function can be performed e.g. by a pixelwise soft-max weighting via the feature map. A cross entropy function can be considered as a loss function. Through the training a weighting for the filter kernels can be determined and represented by the training information 200.

Another loss function that can optionally be used with the invention is described in the literature Geert Litjens et al. (2017), "*A survey on deep learning in medical image analysis*", *Medical Image Analysis*, Volume 42, 2017, pages 60-88, ISSN 1361-8415, https://doi.org/10.1016/j.media.2017.07.005, arXiv:1702.05747 (Ref. 3). The training strategy presented in ref. 3 can also be used for the invention. For example, RGB images can be used as input for the network, so that the respective red, green and blue components of the image are used as input. Augmentation, in particular rotational augmentation, in ref. 3 may be dispensed with if the number of different images used as input is sufficient (e.g. at least 100 or at least 500 or at least 1000). In principle, any artificial augmentation can thus be dispensed with if a larger amount of data is created as input for application data. An overview of further possible network architectures, which are applicable for other input types of the ground truth (e.g. for classification, 3D segmentation or similar), can be found in Ref. 2.

An optional possibility for the determination of ground truth 12 can be the use of fluorescence images (from wide field or cofocal images) or phase images from digital holographic procedures or a Raman spectrum for the classification of a cell or FLIM images or information, which can be determined in each case by the target detection (reference detection).

It may be possible that by recording the different sample positions, the training information 200 for a continuous relative movement of the sample to determine the additional information 115 is trained, as described in more detail below. Both input detection 101 and target detection 102 can each be performed as training system-side detection 101, 102 by an optical training system 4, whereby the application technology and training technology are each performed as a microscopy or flow cytometry. In this way, the training 130 for determining the additional information 115 is suitable for determining the training information 200 in such a way that the evaluation means 60 determines at least approximately the additional information 115 during a subsequent evaluation 120 on the application system side. For example, methods of machine learning, in particular deep learning, are used for training 130.

Optionally, architectures and algorithms that are generally available in the field of machine learning and in particular deep learning can be used at least partially for training and in particular for the evaluation tool 60 and can be used universally for different classes of problems. Thus, it may be possible to use for training 130 known implementations of neural networks essentially unchanged. In contrast to the concrete network architecture, a very large amount of data can be of greater relevance for the training outcome. Especially in the field of microscopy and flow cytometry, large amounts of data can easily be made available for training 130. Nevertheless, within the framework of the invention, the quality of the function of the applied training information 200 may not be important if the evaluation means 60 with the training information 200 is used in an application system 5 for application system detection 101'. Rather, the steps defined according to the invention can be decisive, especially for training. By recording different sample positions, these can cause a training of the training information 200 for the continuous relative movement of the sample to determine the additional information 115. In other words, a solution can be proposed according to the invention to adapt a training 130 of the training information 200 and in particular a neural network to a continuous sample relative movement on the application system side. The training information 200 can be the information resulting from the training (e.g. a weighting and/or a classifier for the network).

Conventionally, it can be technically difficult and therefore unusual to take continuous pictures in microscopy, as the photon yield can be very low. Therefore, the invention-based solution can offer the advantage of enabling a continuous relative movement of the sample in the application system. Depending on which exposure time (illumination time or recording time of a camera) is used, problems such as motion blur and/or interference such as noise can occur as a result of the continuous relative movement of the sample during input detection, and thus impair the quality of the 110' detection information in the application system (reducing the exposure time may reduce the motion blur). In order to reduce this loss of quality and still enable the continuous relative movement of the sample, the additional information 115 can be determined from the detection information 110' using the training information 200. Depending on the success of training 130 this additional information 115 can provide a new detection information 110' with (more or less) less impairment. In other words, the application-side detection information 110' may initially have noise and/or motion blur, which may be at least partially reduced by the additional information 115.

Optionally, input detection 101 can be performed in the same way as input detection 101 of at least one sample 2 with cell nuclei. Thus, the input recording 110 can result from the recording of several cell nuclei. The target record 112 can represent a segmentation of these nuclei as ground truth. In addition to this exemplary execution, an application for object types and questions other than (2D) segmentation is also conceivable, such as 3D segmentation or image regression. The network structure and training strategy described can also be used here. It may also be advantageous in these cases to perform training 130 for continuous sample relative displacement.

An exemplary training 130 is described below. After a first training step, sample 2 can be provided in the form of a cell sample 2, e.g. cell nuclei labelled with DAPI (4',6-Diamidin-2-phenylindo), at training system 4. The Training System 4 can therefore be configured as a fluorescence microscope. Subsequently, an automated and step-by-step recording of the input recording 110 of sample 2 within the scope of the input recording 101 can be performed according to a second training step. This image can be taken with the fluorescence microscope in the DAPI channel with (too) low exposure time (e.g. 1 ms) in order to obtain the input recording 110 in the form of fluorescence images which are affected by a disturbing influence (such as noise). It is also possible to record the target recording 112 in the DAPI channel with a sufficient exposure time (e.g. 100 ms) step by step within the scope of target detection 102 in order to reduce the interference influence compared to input recording 110. In this way, the additional information 115 (as additional image information due to the longer exposure time) is provided by the training technology. Generally speaking, the training technology may differ from the application technology in that the additional information 115 is provided by a longer exposure time. Subsequently, after a third training step, a one- or two-dimensional segmentation can optionally be performed in the target recording 112 in order to determine the ground truth. In addition to segmentation, further applications are conceivable, such as image regression with subsequent analysis or sample classification for classification estimation, which could be used as ground truth. It is also possible to classify the segmented objects. The above training steps can be repeated, also at other points of the sample or other samples, in order to obtain a sufficiently large training data set for training 130. In the fourth training step, the evaluation medium 60 in particular, preferably a neural network, can be trained with the training data obtained in this way. This can thus be based on DAPI images with a poor signal-to-noise ratio (S/N) as input detection and segmentation masks as ground truth.

According to a further optional application step after the fourth training step, an application system-side detection of 101' with (too) low exposure time (see above, e.g. 1 ms) can be performed by application system 5. For example, as application system 5 a microscope with or without motorized stage can be used to perform a continuous sample relative movement for the 101' detection. In this way, the detection information 110' can be determined for different positions and in a relatively short time by the relative movement of the sample. The detection 101' can be performed e.g. with simultaneous automatic linearly continuously moved sample or manually continuously moved sample. The semi-skilled evaluation tool 60 can then be used distributed 140 or on the same recording system. For example, a segmentation mask corresponding to the quality of a target detection with sufficient exposure time can be obtained. The above procedure can also be used for flow cytometry on flowing cells.

A further optional configuration concerns the use of the additional information in the event of considerable motion blur, if a longer exposure time is used for input detection or application system-side detection 101'. The longer exposure time can further increase the information density. For this embodiment, a continuous relative displacement of the sample (i.e. a continuous relative movement of sample 2) can also be performed during input detection for training 130. After the fourth training step, an optional fifth training step can be provided for this purpose, in which an additional input 101 of sample 2 is recorded in the DAPI channel in order to obtain fluorescence images as an additional input recording 110. In addition, an additional target detection 102 of sample 2 can be performed in the DAPI channel in order to also obtain fluorescence images as an additional target detection 112. For both detections 101, 102, the continuous sample relative movement can be performed. However, the further input detection 101 can take place with a longer exposure time than the further target detection 102, so that the further input detection 110 can show a strong motion blur, but also a high information density. For example, for input detection 101, the exposure time may be 500 ms. By means of the previously trained evaluation means 60 (or the correspondingly trained training information 200 of this evaluation means 60), the further target recording 112 can now be evaluated as application-system detection information 110', in order to obtain, as additional information 115, for example, a better S/N and/or a segmentation mask, and in particular in order to obtain a further ground truth from the result of this evaluation. This ground truth and the further input recording 110 can then be used as training data to (re)learn the evaluation tool 60. A special feature here is that the result of an application of the previously learned evaluation tool 60 is used as ground truth, e.g. segmentation. In this way, a subsequent application system-side detection 101' with long exposure times can be performed on the application system 5, e.g. by a microscope with a motorized stage for continuous sample relative displacement, to obtain the application system-side detection information 110'. The evaluation tool 60, which has been retrained again, can then evaluate the 110' detection information on the application system side, either after distribution 140 or on the same detection system. The use for further applications (such as 3D segmentation, classification or image regression) is also conceivable. According to a further improvement, direction information can also be determined during the acquisition 101' on the application system side. For this purpose, e.g. an illumination for detection 101' can be time-modulated and/or asymmetrically pulsed and preferably synchronized with the camera (in particular camera sensor and in particular monochrome camera for detection 101'). A further possibility is the use of Rheinberg lighting and the recording of the camera in the form of an RGB camera to create a spatial asymmetry, or the use of a recording optical system inclined to the optical axis, or a combination of the measures. Possibilities for determining the direction information can be, for example, pulsed lighting or increasing or decreasing illuminance or another type of temporal (temporally not symmetrical) modulation of the lighting.

According to another example, a pulsed transmission lighting (asynchronous with the camera sensor) can also be used for input detection 101. The exposure time can be very short. Thus, instead of using the previously described DAPI channel for input detection 101, pulsed transmission lighting can also be used. It is also conceivable that several images of the sample are used as detection 110' information for the detection 101' by the application system, which were acquired in short sequence and in particular one after the other. Thus, a direction of movement can also be used for the evaluation by the evaluation tool 60. The ground truth may also optionally be based on a target record 112 obtained from a long exposure, or may have external information on sample 2 (e.g., a dosage of a toxic substance on cell sample 2) to estimate a toxic substance. The ground truth can also be based on a classification of step-by-step recorded images as target record 112 in order to perform a corresponding classification on continuously obtained images using the training evaluation tool 60 or the training information 200. The ground truth can also be based on a classified segmentation and/or 3D segmentation from the target record 112. The use for flow cytometry is also conceivable, in which the ground truth is based on a target record 112, which was recorded at a slow flow time.

Furthermore, it is conceivable that ground truth and/or target record 112 may be obtained by one of the following target records 102:

- a detection, in particular segmentation or localization, of objects and/or cells of sample 2, in particular a segmentation mask,
- segmentation, e.g. a cell compartment, to measure a fluorescence signal in this area,
- localization, e.g. for counting,
- an estimate of the classification or regression of pixels or objects or sample areas of the sample 2,
- classification of individual image pixels,
- classification of whole cells or tissue areas,
- regression of individual image pixels, e.g. fluorescence property, phase information, regression, of whole cells or tissue areas,
- a cytometric or histological analysis result,
- a phase information,
- a three-dimensional information on the spatial structure of sample 2, e.g. a z-stack for differently defocused planes,
- at least one fluorescence property of the sample 2,
- an extended depth of field range of a sample recording, e.g. "Extended Focal Image".

The preceding explanation of the embodiments describes the present invention exclusively in the context of examples. Of course, individual features of the embodiments can be freely combined with each other, if technically reasonable, without leaving the scope of the present invention.

REFERENCE CHARACTER LIST

2 Sample
4 Training system, training microscope
5 Application system
8 Cloud system, central computer system for cloud computing
20 Imaging optics, detection optics
30 Light source, lighting means
35 Channels
40 Detection device, camera
45 Sample moving device, motorized sample table
50 Evaluation device, computer
51 Processor
52 Data storage
60 Evaluation means
70 Network structure
71 Feature channel, feature map
72 Folding 3×3, ReLu
73 Folding 1×1
74 Downsampling, Max Pool 2×2

75 Upsampling, Up-cony 2×2
101 Input detection, training system-side detection
101 First input detection
101b Second input detection
101c Third input detection
102 Target detection, reference detection
110 Input recording
112 Target recording, ground truth
115 Additional information, result information
120 Evaluation
130 Training
140 Distribute
200 Training information, transfer information, trained model
101' Application system-side detection
110' Application system-side detection information
110'a First detection information
110'b Second detection information
112' Processed target recording, segmentation result
NN1 First network
NN2 Second network
NN3 Third network
NN4 Fourth network

The invention claimed is:

1. A method for providing an evaluation means for at least one optical application system of a microscope-based application technology,
wherein the following steps are performed:
performing an input detection of at least one sample according to the application technology in order to obtain at least one input record of the sample from the input detection,
performing a target detection of the sample according to a training technology to obtain at least one target record of the sample from the target detection, the training technology being different from the application technology at least in that additional information about the sample is provided, and
training of the evaluation means at least on the basis of the input recording and the target recording in order to obtain training information of the evaluation means,
wherein various sample positions are automatically detected during input detection or target detection,
wherein the training information for a continuous relative movement of the sample for determining the additional information is trained by the detection of the various sample positions,
wherein the input detection and the target detection are each performed as training system-side detection by an optical training system,
and wherein the application technology and training technology are configured as microscopy or flow cytometry.

2. The method according to claim 1,
wherein
the input detection differs from the target detection at least in that, during the input detection,
the input recording is influenced by a relative movement of the sample, so that the training information is specific for at least reducing this influence and additionally for determining at least the additional information, or
in that various sample positions are automatically detected at least during input detection or during target detection, the various sample positions being obtained at least by an automated step-by-step or continuous relative movement of the sample, so that the training information for the continuous relative movement of the sample is trained to determine the additional information, the training information being determined in such a way that the evaluation means trained in this way at least approximately determines the additional information during a subsequent evaluation on the application system side,
the training is effected by the training information for the evaluation means being determined by machine learning methods, the training information being a classifier or a model or a weighting for at least the evaluation means, or in the application system, which provides the application technology in an identical or similar manner to the training system, the additional information is not determined on the basis of the application technology, but is determined at least approximately only on the basis of the evaluation means.

3. The method according to claim 1,
wherein
at least during input detection or target detection, a completely automated step-by-step or continuous relative sample movement is performed, for which the training information is specifically trained.

4. The method according to claim 1,
wherein
during input detection and during target detection, a completely automated step-by-step or continuous relative movement of the sample is performed in a motorized manner in order to determine, for at least a multiplicity of objects of the sample or for a multiplicity of samples, in each case at least one input and target recording as training data for training, a ground truth for the training being determined automatically on the basis of the target recording.

5. The method according to claim 1,
wherein
the target recording or the input recording each have recordings of the sample at the different sample positions, wherein at least during the input detection or during the target detection during a motorized automated continuous or gradual relative displacement of the sample positional data on the sample positions are determined in order to assign the recordings to the sample positions based on the position data.

6. The method according to claim 1,
wherein
in that the training information is specific for determining the additional information on the basis of a recording information on the application system side which is determined by an optical application system by means of an input recording on the application system side which is subsequently performed and in which a continuous relative movement of the sample takes place, the application system being configured to provide the application technology, and the training system being configured additionally to provide the training technology.

7. The method according to claim 1,
wherein
the evaluation means is configured as at least a computer program based on machine learning or artificial intelligence or deep learning, and preferably has one or more artificial neural networks in accordance with a training hierarchy, preferably a first one of the networks being trained to determine the additional information and at least a second one of the networks being trained to compensate for the continuous relative displacement of the samples.

8. The method according to claim 1, wherein
during training, a plurality of neural networks of the evaluation means are hierarchically trained for respective processing of the input recording.

9. The method according to claim 1, wherein
at least one detection device and at least one lighting means of a training system are used for input and target detection, with
in the input detection the sample is continuously or step-by-step at least relatively displaced in at least a first detection mode or with a first illumination level relative to the training system over more than one entire detection field of the detection device in order to obtain the input recording of an area of the sample,
in the target detection, at least partially the same area of the sample is acquired at least in a second detection mode or with a second illumination level in order to obtain the target recording,
in which a ground truth is determined from the target record in the training and target data are determined from the input record, which target data are used for training at least a first neural network in order to determine the training information,
optionally: training at least one further neural network by means of the first neural network to determine the training information specific to a neural network system of all trained neural networks, and
applying the evaluation means with the training information to an application system for application system-side detection at least in the first recording mode or with the first illumination level in order to obtain application system-side detection information, at least one sample for this purpose being continuously displaced at least relatively over more than one entire detection field of a further detection device.

10. The method according to claim 1, wherein
the method steps of the input and target detection method are performed completely automatically, so that no manual intervention is needed.

11. The method according to claim 1, wherein
at least different depths of the sample are at least detected during the input or target detection or during the detection on the application system side, so that at least the input recording or the target recording or detection information of the detection on the application system side has a stack with recording of the sample for axial sample positions, wherein the different depths of the sample are preferably detected by sample areas of the different depths are imaged onto different areas of a sensor of a detection device, wherein for this purpose the sensor is preferably arranged inclined with respect to an optical axis in at least the application system, or
wherein at least the input detection or target detection or further target detections for training are performed simultaneously or with a time lag for different sample positions by different channels of the training system.

12. A system for providing an evaluation means for at least one optical application system of a microscope-based application technology comprising:

at least one detection device for performing an input detection of at least one sample according to the application technology in order to obtain at least one input record of the sample from the input detection, the or at least one further detection device for performing a target detection of the sample according to a training technology in order to obtain at least one target recording of the sample on the basis of the target detection, wherein the training technology differs from the application technology at least in that the training technology is implemented for providing additional information about the sample, an evaluation device for training the evaluation means at least on the basis of the input recording and the target recording in order to obtain training information of the evaluation means, and a sample moving device for relative movement of the sample in order to automatically detect various sample positions during at least input detection or target detection, wherein the training information for a continuous relative movement of the sample for determining the additional information is trained by the detection of the various sample positions, wherein the input detection and the target detection are each performed as training system-side detection by an optical training system, and wherein the application technology and training technology are implemented as microscopy or flow cytometry.

13. A non-transitory storage medium storing a computer program comprising instructions which, when the computer program is executed by a computer, cause the computer to determine additional information about a sample on the basis of at least one input record of the sample and on the basis of training information, wherein the input record is specific for an input detection of the sample in accordance with an application technology and the training information is determined according to a method for providing an evaluation means for at least one optical application system of a microscope-based application technology,
wherein the following steps are performed:
performing an input detection of at least one sample according to the application technology in order to obtain at least one input record of the sample from the input detection,
performing a target detection of the sample according to a training technology to obtain at least one target record of the sample from the target detection, the training technology being different from the application technology at least in that additional information about the sample is provided, and
training of the evaluation means at least on the basis of the input recording and the target recording in order to obtain training information of the evaluation means,
wherein various sample positions are automatically detected during input detection or target detection,
wherein the training information for a continuous relative displacement of the sample for determining the additional information is trained by the detection of the various sample positions,
wherein the input detection and the target detection are each performed as training system-side detection by an optical training system, and wherein the application technology and training technology are configured as microscopy or flow cytometry.

14. A non-transitory storage medium storing a computer program comprising instructions which, when the computer program is executed by a computer, cause the computer to execute the steps of a method for providing an evaluation means for at least one optical application system of a microscope-based application technology,
wherein the following steps are performed:
performing an input detection of at least one sample according to the application technology in order to obtain at least one input record of the sample from the input detection,
performing a target detection of the sample according to a training technology to obtain at least one target record of the sample from the target detection, the training technology being different from the application technology at least in that additional information about the sample is provided, and
training of the evaluation means at least on the basis of the input recording and the target recording in order to obtain training information of the evaluation means,
wherein various sample positions are automatically detected during input detection or target detection,
wherein the training information for a continuous relative movement of the sample for determining the additional information is trained by the detection of the various sample positions,
and wherein the input detection and the target detection are each performed as training system-side detection by an optical training system, and wherein the application technology and training technology are configured as microscopy or flow cytometry.

15. A computer-readable medium on which the computer program is stored according to
a non-transitory storage medium storing a computer program comprising instructions which, when the computer program is executed by a computer, cause the computer to determine additional information about a sample on the basis of at least one input record of the sample and on the basis of training information, wherein the input record is specific for an input detection of the sample in accordance with an application technology and the training information is determined according to
a method for providing an evaluation means for at least one optical application system of a microscope-based application technology,
wherein the following steps are performed:
performing an input detection of at least one sample according to the application technology in order to obtain at least one input record of the sample from the input detection,
performing a target detection of the sample according to a training technology to obtain at least one target record of the sample from the target detection, the training technology being different from the application technology at least in that additional information about the sample is provided, and
training of the evaluation means at least on the basis of the input recording and the target recording in order to obtain training information of the evaluation means,
wherein various sample positions are automatically detected during input detection or target detection,
wherein the training information for a continuous relative movement of the sample for determining the additional information is trained by the detection of the various sample positions,
wherein the input detection and the target detection are each performed as training system-side detection by an optical training system,
and wherein the application technology and training technology is configured as microscopy or flow cytometry
or
a computer program comprising instructions which, when the computer program is executed by a computer, cause the computer to determine additional information about a sample on the basis of at least one input record of the sample and on the basis of training information, wherein the input record is specific for an input detection of the sample in accordance with an application technology and the training information is determined according to
a method for providing an evaluation means for at least one optical application system of a microscope-based application technology,
wherein the following steps are performed:
performing an input detection of at least one sample according to the application technology in order to obtain at least one input record of the sample from the input detection,
performing a target detection of the sample according to a training technology to obtain at least one target record of the sample from the target detection, the training technology being different from the application technology at least in that additional information about the sample is provided, and
training of the evaluation means at least on the basis of the input recording and the target recording in order to obtain training information of the evaluation means,
wherein various sample positions are automatically detected during input detection or target detection,
wherein the training information for a continuous relative movement of the sample for determining the additional information is trained by the detection of the various sample positions,
wherein the input detection and the target detection are each performed as training system-side detection by an optical training system,
and wherein the application technology and training technology are configured as microscopy or flow cytometry.

* * * * *